(12) United States Patent
Ray et al.

(10) Patent No.: US 12,164,017 B2
(45) Date of Patent: Dec. 10, 2024

(54) METHOD AND SYSTEM FOR DETECTION OF A DESIRED OBJECT OCCLUDED BY PACKAGING

(71) Applicant: Tata Consultancy Services Limited, Mumbai (IN)

(72) Inventors: Arindam Ray, Kolkata (IN); Taniya Das, Kolkata (IN); Arijit Chowdhury, Kolkata (IN); Soumya Chakravarty, Kolkata (IN); Smriti Rani, Kolkata (IN); Anwesha Khasnobish, Kolkata (IN); Tapas Chakravarty, Kolkata (IN); Arpan Pal, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 449 days.

(21) Appl. No.: 17/453,103

(22) Filed: Nov. 1, 2021

(65) Prior Publication Data
US 2022/0381893 A1    Dec. 1, 2022

(30) Foreign Application Priority Data
May 28, 2021 (IN) .............................. 202121023848

(51) Int. Cl.
*G01S 13/04* (2006.01)
*G01S 5/02* (2010.01)
(Continued)

(52) U.S. Cl.
CPC ............ *G01S 13/04* (2013.01); *G01S 5/0226* (2013.01); *G01S 13/87* (2013.01); *G01S 13/887* (2013.01)

(58) Field of Classification Search
CPC .......... G01S 13/04; G01S 13/89; G01S 13/88; G01S 13/87; G01S 7/352; G01S 7/003;
(Continued)

(56) References Cited

U.S. PATENT DOCUMENTS

2007/0181685 A1* 8/2007 Zhu .................... G06K 7/10792
                                                                    235/454
2020/0209374 A1* 7/2020 Lee ........................ G01S 5/0226
(Continued)

FOREIGN PATENT DOCUMENTS

| CN | 112859063 A | * | 1/2021 |
| KR | 20180016820 A | | 2/2018 |
| WO | WO2019183339 A1 | | 9/2019 |

OTHER PUBLICATIONS

Kram, Sebastian et al., "UWB channel impulse responses for positioning in complex environments: A detailed feature analysis", *Sensors*, Date: Dec. 2019, vol. 19 (24), Publisher: MDPI, https://www.mdpi.com/1424-8220/19/24/5547.

*Primary Examiner* — Vladimir Magloire
*Assistant Examiner* — Remash R Guyah
(74) *Attorney, Agent, or Firm* — FINNEGAN, HENDERSON, FARABOW, GARRETT & DUNNER LLP

(57) ABSTRACT

An e-commerce business model has witnessed several cases where packages with faulty goods, returned by buyers, without procured object, rather replaced by different device. This disclosure relates a method to detect whether object under test a desired object. A plurality of back-scattered signals is received from the object under test occluded by packaging with continuous motion on conveyer based on first antenna-radar combination. The plurality of back-scattered signals is processed by applying four-tap difference filter to obtain motion-filtered data matrix. A low pass filter is applied on the motion-filtered data matrix to obtain enveloped motion-filtered data matrix. A sliding constant false alarm rate is applied on the enveloped motion-filtered data matrix to determine detection threshold value. A check is performed to detect whether the object under test is the
(Continued)

desired object based on whether intensity of the plurality back-scattered signals exceeds the detection threshold value.

12 Claims, 11 Drawing Sheets

(51) Int. Cl.
*G01S 13/87* (2006.01)
*G01S 13/88* (2006.01)

(58) Field of Classification Search
CPC ...... G01S 13/343; G01S 13/584; G01S 7/356; G01S 13/931; G01S 2013/93271; G01S 2013/93272; G01S 2013/93274; G01S 2013/93275; G01S 7/35; G01S 7/41; G01S 13/32; G01S 13/90; G01S 13/888; G01S 13/9004; G01S 7/4091; G01S 13/887; G01S 13/865; G01S 13/867; G01S 7/4026; G01S 13/347; G01S 13/536; G01S 7/412; G01S 13/46; G01S 7/417; G01S 7/415; G01S 2013/462; G01S 5/0226; G01S 5/0242; G01S 13/0209; G06F 18/24147; G06N 3/044; G06N 3/045; G06N 3/08; Y02D 30/70
USPC .......................................................... 342/22
See application file for complete search history.

(56) References Cited

U.S. PATENT DOCUMENTS

2021/0255278 A1* 8/2021 Roger .................. G01S 13/343
2021/0405182 A1* 12/2021 Reynolds .............. G01S 13/887

* cited by examiner

METHOD AND SYSTEM FOR DETECTION OF A DESIRED OBJECT OCCLUDED BY PACKAGING

PRIORITY CLAIM

This U.S. patent application claims priority under 35 U.S.C. § 119 to: India Application No. 202121023848, filed on 28 May 2021. The entire contents of the aforementioned application are incorporated herein by reference.

TECHNICAL FIELD

This disclosure relates generally to object detection system, and, more particularly, to method and system for detection of a desired object from an object under test occluded by packaging.

BACKGROUND

There is a major growth in recent years in retail due to digital transformation. The rapid expansion of e-commerce market segment is largely triggered by purchase of high-valued electronic consumer devices. Majority of such devices like mobile phones, tablets, laptops, etc. are ordered online and delivered via couriers. This e-commerce business model has witnessed several cases where packages with faulty goods, returned by buyers, did not contain procured object, rather being replaced by a different device. It is noted that in a few cases, the packages that are returned do not contain the procured object, instead being replaced by a different device or objects of other types. For such scenarios, companies feel a need to check content of the package that are returned without unsealing it. For this purpose, various technologies for imaging in occluded space are used, such as X Rays, Radio Frequency Identification (RFIDs), radars etc.

Existing methodologies utilize RFID to track packages in a warehouse. However, this requires attaching tags to each package and is expensive. In logistics, a given package needs to be scanned to ensure that proper items are placed within the package. For example, when a customer returns a phone in its original package, the package must be scanned to ensure that there is a phone inside with specific dimensions. Currently, X ray scanners are used for this purpose and the X ray scanners operate at a high energy level and in peta hertz to exahertz range of frequency. Moreover, x rays are ionizing rays and are absorbed by the human body. Accordingly, current scenario, when a sealed package is returned (usually in cardboard packages), the existing systems are inefficient to identify whether the packages contain the specific object or product being returned without breaking the seal.

SUMMARY

Embodiments of the present disclosure present technological improvements as solutions to one or more of the above-mentioned technical problems recognized by the inventors in conventional systems. For example, in one aspect, a processor implemented method of detecting a desired object from an object under test occluded by packaging is provided. The processor implemented method includes at least one of: receiving, via one or more hardware processors, a plurality of back-scattered signals from an object under test packed inside a package positioned on a conveyer; and processing, via the one or more hardware processors, the plurality of back-scattered signals using a first approach to detect whether the object under test is a desired object. The first approach is applied when the object under test is having continuous motion across the scanning chamber. The processing via the first approach includes: processing, the plurality of back-scattered signals by applying a four-tap difference filter to obtain a motion-filtered data matrix; applying, a low pass filter, on the motion-filtered data matrix to obtain an enveloped motion-filtered data matrix; applying, a sliding constant false alarm rate (CFAR) on the enveloped motion-filtered data matrix to determine a detection threshold value; and detecting, whether the object under test is a desired object based on whether an intensity of the plurality back-scattered signals exceeds the detection threshold value. The plurality of back-scattered signals are received via a first antenna-radar combination mounted on a scanning chamber if the object under test is having continuous motion across the scanning chamber. The plurality of back-scattered signals are received via a second antenna-radar combination mounted on the scanning chamber if the object under test is having a plurality of stops across the scanning chamber.

In an embodiment, the plurality of back-scattered signals are processed using the second approach to detect whether the object under test is the desired object. In an embodiment, the second approach is applied when the object under test having the plurality of stops across the scanning chamber. In an embodiment, the processing via the second approach includes: converting, the plurality of back-scattered signals into a plurality of frequency domain signals by a Fast Fourier transform (FFT); extracting, via the one or more hardware processors, a plurality of features from the plurality of frequency domain signals at a first frequency band ($f_0$) and a second frequency band ($2f_0$); and processing, by a binary classifier, the extracted plurality of features to detect whether the object under test is the desired object. In an embodiment, the plurality of back-scattered signals are acquired as a range-time matrix. In an embodiment, each of the plurality of frequency domain signals includes (a) an amplitude component, and (b) a phase component. In an embodiment, the plurality of features captures signal patterns in the plurality of frequency domain signals. In an embodiment, the binary classifier corresponds to a K nearest neighbour. In an embodiment, the first antenna-radar combination includes three radar unit. In an embodiment, the three-radar unit include three antennas connected to three radar units respectively. In an embodiment, the three-radar unit triggers the three antennas respectively to scan the object under test from an entry position to an exit position across the scanning chamber. In an embodiment, the three radar units are time synchronized with a maximum uncertainty of +/−500 milli seconds. In an embodiment, the second antenna-radar combination includes three antennas connected to a radar unit. In an embodiment, the radar unit triggers the three antennas in a sequential manner to scan the object under test at the plurality of stops across the scanning chamber. In an embodiment, the detection threshold value is determined based on a plurality of average values of at least one set for at least one reference cell from set of reference cells, and a scale factor ($\alpha$). In an embodiment, the at least one cell corresponds to at least one guard cell which are filtered to remove a part of the actual peak value. In an embodiment, the scale factor ($\alpha$) is a constant and selected based on a desired probability of a false alarm. In an embodiment, the false alarm occurs when an intensity of the plurality back-scattered signals exceeds the detection threshold value at a time and a range point where no desired object is located.

In another aspect, there is provided a system for detection of a desired object from an object under test occluded by packaging. The system includes a memory storing instructions; one or more communication interfaces; and one or more hardware processors coupled to the memory via the one or more communication interfaces, wherein the one or more hardware processors are configured by the instructions to: receive, a plurality of back-scattered signals from an object under test packed inside a package positioned on a conveyer; and process, the plurality of back-scattered signals using a first approach to detect whether the object under test is a desired object. The first approach is applied when the object under test is having continuous motion across the scanning chamber. The process via the first approach includes: process, the plurality of back-scattered signals by applying a four-tap difference filter to obtain a motion-filtered data matrix; apply, a low pass filter, on the motion-filtered data matrix to obtain an enveloped motion-filtered data matrix; apply, a sliding constant false alarm rate (CFAR) on the enveloped motion-filtered data matrix to determine a detection threshold value; and detect, whether the object under test is a desired object based on whether an intensity of the plurality back-scattered signals exceeds the detection threshold value. In an embodiment, the plurality of back-scattered signals are received via a first antenna-radar combination mounted on a scanning chamber if the object under test is having continuous motion across the scanning chamber. In an embodiment, the plurality of back-scattered signals are received via a second antenna-radar combination mounted on the scanning chamber if the object under test is having a plurality of stops across the scanning chamber.

In an embodiment, the one or more hardware processors are further configured by the instructions to process, the plurality of back-scattered signals using the second approach to detect whether the object under test is the desired object. In an embodiment, the second approach is applied when the object under test having the plurality of stops across the scanning chamber. In an embodiment, the process via the second approach includes: convert, the plurality of back-scattered signals into a plurality of frequency domain signals by a Fast Fourier transform (FFT); extract, a plurality of features from the plurality of frequency domain signals at a first frequency band ($f_0$) and a second frequency band ($2f_0$); and process, by a binary classifier, the extracted plurality of features to detect whether the object under test is the desired object. In an embodiment, the plurality of back-scattered signals are acquired as a range-time matrix. In an embodiment, each of the plurality of frequency domain signals includes (a) an amplitude component, and (b) a phase component. In an embodiment, the plurality of features captures signal patterns in the plurality of frequency domain signals. In an embodiment, the binary classifier corresponds to a K nearest neighbour. In an embodiment, the first antenna-radar combination includes three radar unit. In an embodiment, the three-radar unit include three antennas connected to three radar units respectively. In an embodiment, the three-radar unit triggers the three antennas respectively to scan the object under test from an entry position to an exit position across the scanning chamber. In an embodiment, the three radar units are time synchronized with a maximum uncertainty of +/−500 milli seconds. In an embodiment, the second antenna-radar combination includes three antennas connected to a radar unit. In an embodiment, the radar unit triggers the three antennas in a sequential manner to scan the object under test at the plurality of stops across the scanning chamber. In an embodiment, the detection threshold value is determined based on a plurality of average values of at least one set for at least one reference cell from set of reference cells, and a scale factor ($\alpha$). In an embodiment, the at least one cell corresponds to at least one guard cell which are filtered to remove a part of the actual peak value. In an embodiment, the scale factor ($\alpha$) is a constant and selected based on a desired probability of false alarm. In an embodiment, the false alarm occurs when an intensity of the plurality back-scattered signals exceeds the detection threshold value at a time and a range point where no desired object is located.

In yet another aspect, there are provided one or more non-transitory machine readable information storage mediums comprising one or more instructions which when executed by one or more hardware processors causes at least one of: receiving, a plurality of back-scattered signals from an object under test packed inside a package positioned on a conveyer; and processing, the plurality of back-scattered signals using a first approach to detect whether the object under test is a desired object. The first approach is applied when the object under test is having continuous motion across the scanning chamber. The processing via the first approach includes: processing, the plurality of back-scattered signals by applying a four-tap difference filter to obtain a motion-filtered data matrix; applying, a low pass filter, on the motion-filtered data matrix to obtain an enveloped motion-filtered data matrix; applying, a sliding constant false alarm rate (CFAR) on the enveloped motion-filtered data matrix to determine a detection threshold value; and detecting, whether the object under test is a desired object based on whether an intensity of the plurality back-scattered signals exceeds the detection threshold value. The plurality of back-scattered signals are received via a first antenna-radar combination mounted on a scanning chamber if the object under test is having continuous motion across the scanning chamber. The plurality of back-scattered signals are received via a second antenna-radar combination mounted on the scanning chamber if the object under test is having a plurality of stops across the scanning chamber.

In an embodiment, the plurality of back-scattered signals may be processed using the second approach to detect whether the object under test is the desired object. In an embodiment, the second approach is applied when the object under test having the plurality of stops across the scanning chamber. In an embodiment, the processing via the second approach includes: converting, the plurality of back-scattered signals into a plurality of frequency domain signals by a Fast Fourier transform (FFT); extracting, a plurality of features from the plurality of frequency domain signals at a first frequency band ($f_0$) and a second frequency band ($2f_0$); and processing, by a binary classifier, the extracted plurality of features to detect whether the object under test is the desired object. In an embodiment, the plurality of back-scattered signals are acquired as a range-time matrix. In an embodiment, each of the plurality of frequency domain signals includes (a) an amplitude component, and (b) a phase component. In an embodiment, the plurality of features captures signal patterns in the plurality of frequency domain signals. In an embodiment, the binary classifier corresponds to a K nearest neighbour. In an embodiment, the first antenna-radar combination includes three radar unit. In an embodiment, the three-radar unit include three antennas connected to three radar units respectively. In an embodiment, the three-radar unit triggers the three antennas respectively to scan the object under test from an entry position to an exit position across the scanning chamber. In an embodiment, the three radar units are time synchronized with a maximum uncertainty of +/−500 milli seconds. In an embodiment, the second antenna-radar combination includes three antennas connected to a radar unit. In an embodiment, the radar unit triggers the three antennas in a sequential manner to scan the object under test at the plurality of stops across the scanning chamber. In an embodiment, the detection threshold value is determined based on a plurality of average values of at least one set for at least one reference cell from set of reference cells, and a scale factor ($\alpha$). In an embodiment, the at least one cell corresponds to at least one guard cell which are filtered to remove a part of the actual peak value. In an embodiment, the scale factor ($\alpha$) is a constant and selected based on a desired probability of a false alarm. In an embodiment, the false alarm occurs when an intensity of the plurality back-scattered signals exceeds the detection threshold value at a time and a range point where no desired object is located.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
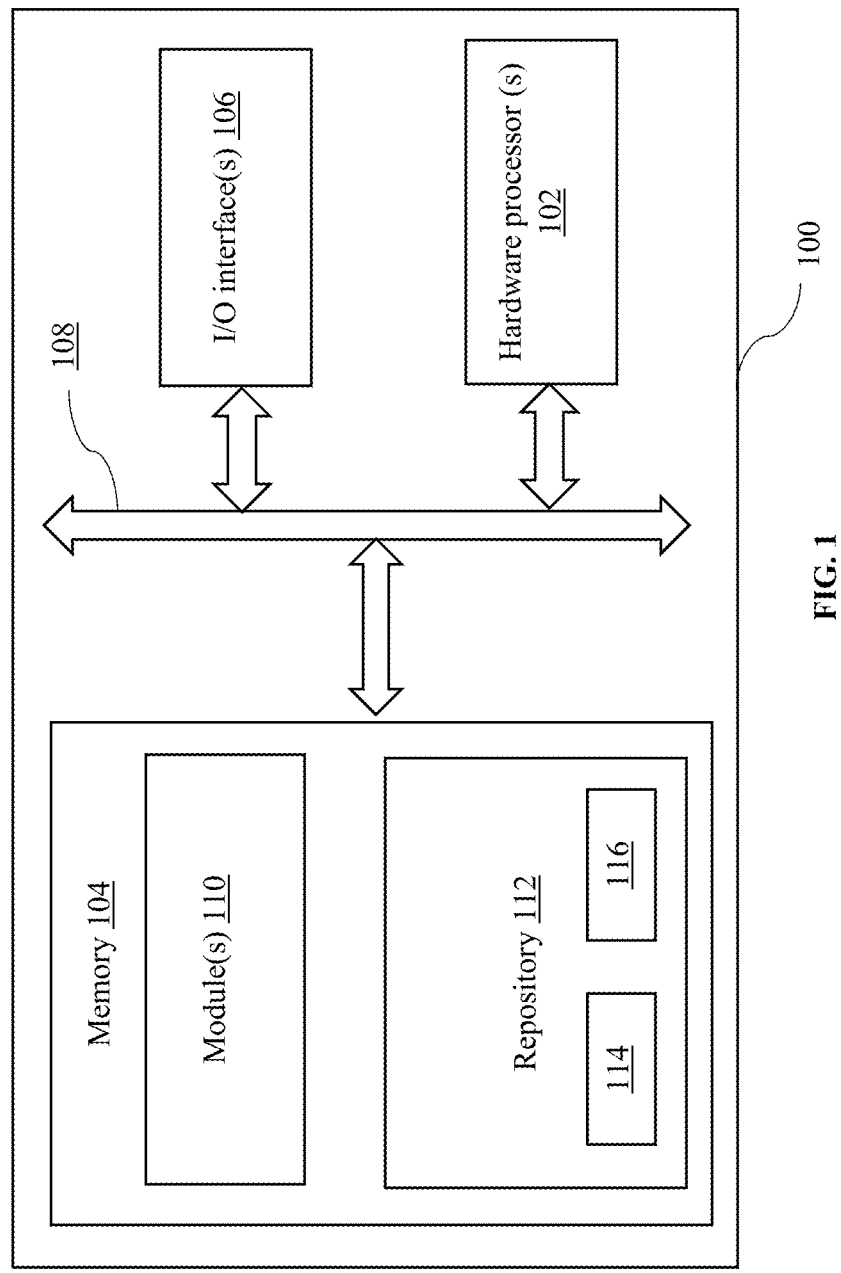
FIG. 1 illustrates a system for detection of a desired object from an object under test occluded by packaging, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

There is a need to unobtrusively (i.e., without breaking a seal) detect any changes in a content of a sealed package. Embodiments of the present disclosure provide a system for detection of an object under test occluded by packaging. The embodiment of the present disclosure provides an approach for marker less identification of the object under test in an occluded space (package) when an electronic object rolled out and when they are returned. The method utilizes an ultra-wide band radar with an ability to penetrate radio transparent boxes. The embodiment of the present disclosure utilizes learning models and change detection to check whether the desired object is present or not based on apriori information.

Referring now to the drawings, and more particularly to FIGS. 1 through 9, where similar reference characters denote corresponding features consistently throughout the figures, there are shown preferred embodiments and these embodiments are described in the context of the following exemplary system and/or method.

FIG. 1 illustrates a system 100 for detection of a desired electronic object from an object under test 204 occluded by packaging, according to an embodiment of the present disclosure. In an embodiment, the system 100 includes one or more processor(s) 102, communication interface device(s) or input/output (I/O) interface(s) 106, and one or more data storage devices or memory 104 operatively coupled to the one or more processors 102. The memory 104 includes a database. The one or more processor(s) processor 102, the memory 104, and the I/O interface(s) 106 may be coupled by a system bus such as a system bus 108 or a similar mechanism. The system 100 is further connected to a radar and antenna unit (Not Shown in figure) via the I/O interface(s) 106. The one or more processor(s) 102 that are hardware processors can be implemented as one or more microprocessors, microcomputers, microcontrollers, digital signal processors, central processing units, state machines, logic circuitries, and/or any devices that manipulate signals based on operational instructions. Among other capabilities, the one or more processor(s) 102 is configured to fetch and execute computer-readable instructions stored in the memory 104. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like. The I/O interface device(s) 106 may include a variety of software and hardware interfaces, for example, interfaces for peripheral device(s), such as a keyboard, a mouse, an external memory, a camera device, and a printer. Further, the I/O interface device(s) 106 may enable the system 100 to communicate with other devices, such as web servers and external databases. The I/O interface device(s) 106 can facilitate multiple communications within a wide variety of networks and protocol types, including wired networks, for example, local area network (LAN), cable, etc., and wireless networks, such as Wireless LAN (WLAN), cellular, or satellite. In an embodiment, the I/O interface device(s) 106 can include one or more ports for connecting number of devices to one another or to another server.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 110 and a repository 112 for storing data processed, received, and generated by the plurality of modules 110. The plurality of modules 110 may include routines, programs, objects, components, data structures, and so on, which perform particular tasks or implement particular abstract data types.

Further, the database stores information pertaining to inputs fed to the system 100 and/or outputs generated by the system (e.g., data/output generated at each stage of the data processing) 100, specific to the methodology described herein. More specifically, the database stores information being processed at each step of the proposed methodology.

Additionally, the plurality of modules 110 may include programs or coded instructions that supplement applications and functions of the system 100. The repository 112, amongst other things, includes a system database 114 and other data 116. The other data 116 may include data generated as a result of the execution of one or more modules in the plurality of modules 110. Further, the database stores information pertaining to inputs fed to the system 100 and/or outputs generated by the system (e.g., at each stage), specific to the methodology described herein. Herein, the memory for example the memory 104 and the computer program code configured to, with the hardware processor for example the processor 102, causes the system 100 to perform various functions described herein under.

Figure 2:
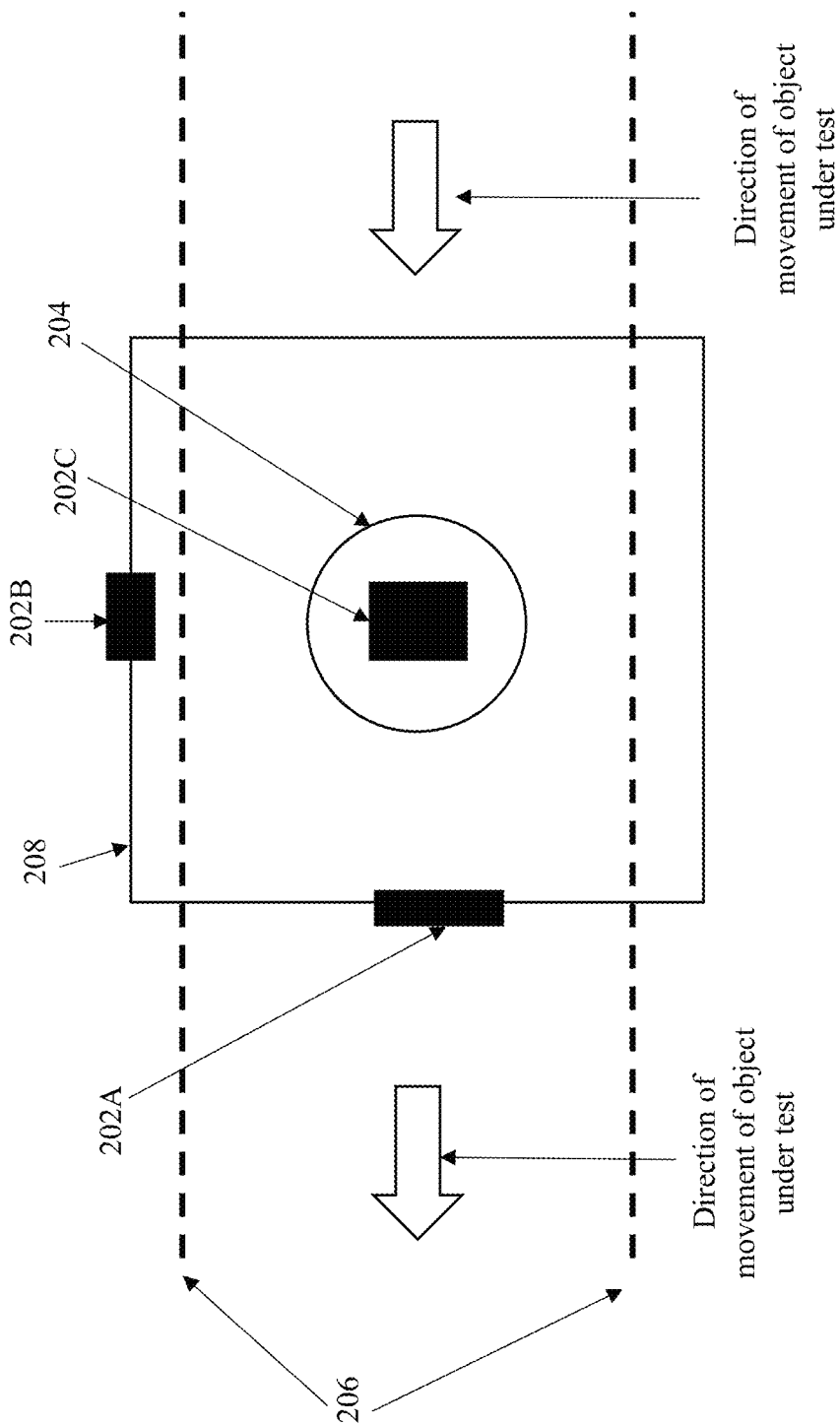
FIG. 2 illustrates a schematic block diagram of the system of FIG. 1, according to some embodiments of the present disclosure.

FIG. 2 illustrates a schematic block diagram of the system 100 of FIG. 1, according to some embodiments of the present disclosure. The system 200 may be an example of the system 100 (FIG. 1). In an example embodiment, the system 200 may be embodied in, or is in direct communication with the system, for example the system 100 (FIG. 1). The system 200 includes a radar and antenna unit 202A-C, the object under test 204, and a conveyor 206, an enclosure 208. In an embodiment, the radar and antenna unit 202A-C include a ultrawide band (UWB) Tx/Rx antennas. The first antenna-radar combination includes three antennas connected to three radar units, respectively. The first antenna-radar combination are selected from the radar and antenna unit 202A-C. A one or more back-scattered signals are received from the object under test 204 packed in a package positioned on the conveyor 206. In an embodiment, the one or more back-scattered signals are received via the first antenna-radar combination mounted on a scanning chamber (not shown in figure) if the object under test 204 is having continuous motion across the scanning chamber.

The three antenna-radar units trigger the three antennas respectively to scan the object under test 204 from an entry position to an exit position across the scanning chamber. The three antenna-radar units are time synchronized with a maximum uncertainty of +/−500 milli seconds. For example, all three antennas continue to scan image from an entry position of the object under test 204 till exits the scanner chamber. For each image obtained by each individual radar, a modified CFAR approach (e.g., sliding constant false alarm rate (CFAR) approach) is applied, and a detection threshold value is obtained. In an embodiment, the modified CFAR approach is utilized to detect a high-value, linearly moving object under test (i.e., to-and-fro motion in a plane orthogonal to a look angle of the three antenna-radar units 202A-C) in the object under test 204 i.e., an enclosed box and to determine if the contents of the box are changed.

The one or more back-scattered signals are utilized to detect whether the object under test 204 is a desired object. For example, the desired object herein is an electronic object and throughout the description the term desired object and desired electronic object can be used interchangeably. A first approach is applied when the object under test 204 is having continuous motion across the scanning chamber. The one or more back-scattered signals are obtained in a form of a range-time matrix from the three antenna-radar units 202A-C from the target is processed using a third order IIR (Infinite Impulse Response) bandpass filter covering 3.1-4.8 GHz. The one or more back-scattered signals are subsequently motion-filtered by applying a four-tap difference filter to obtain a motion-filtered data matrix and given by equation 1:

$$y(n)=x(n)-0.6*x(n-1)-0.3*x(n-2)-0.1*x(n-3). \quad (1)$$

A low pass filter (e.g., sixth order IIR) is applied on the motion-filtered data matrix to obtain an enveloped motion-filtered data matrix. In an embodiment, a final dataset (i.e., range-time matrix) obtained after filtering is named as "M". The sliding constant false alarm rate (CFAR) approach is applied on the enveloped motion-filtered data matrix e.g., the final dataset (M) for each range bin and each scan time, to ascertain presence of the desired object based on whether intensity of the one or more back-scattered signals exceeds a detection threshold value (Th). In an embodiment, whether the object under test 204 is the desired electronic object is detected based on whether an intensity of the one or more back-scattered signals exceeds the detection threshold value (Th). The method disclosed herein is based on the fact that parts such as semi-conductor ICs, screens, electronic circuit layouts and the like, if present in an object, have back-scattered signals with higher intensity. Any electronic device or electronic object such as a mobile phone, a laptop and the like are typical examples of the object having such parts. However, it can be understood by person having ordinary skill in the art that any object, which includes parts that have back-scattered signals of desired intensity can be detected by the disclosed method, and mention of the electronic object is a mere example and not a limitation.

Figure 3:
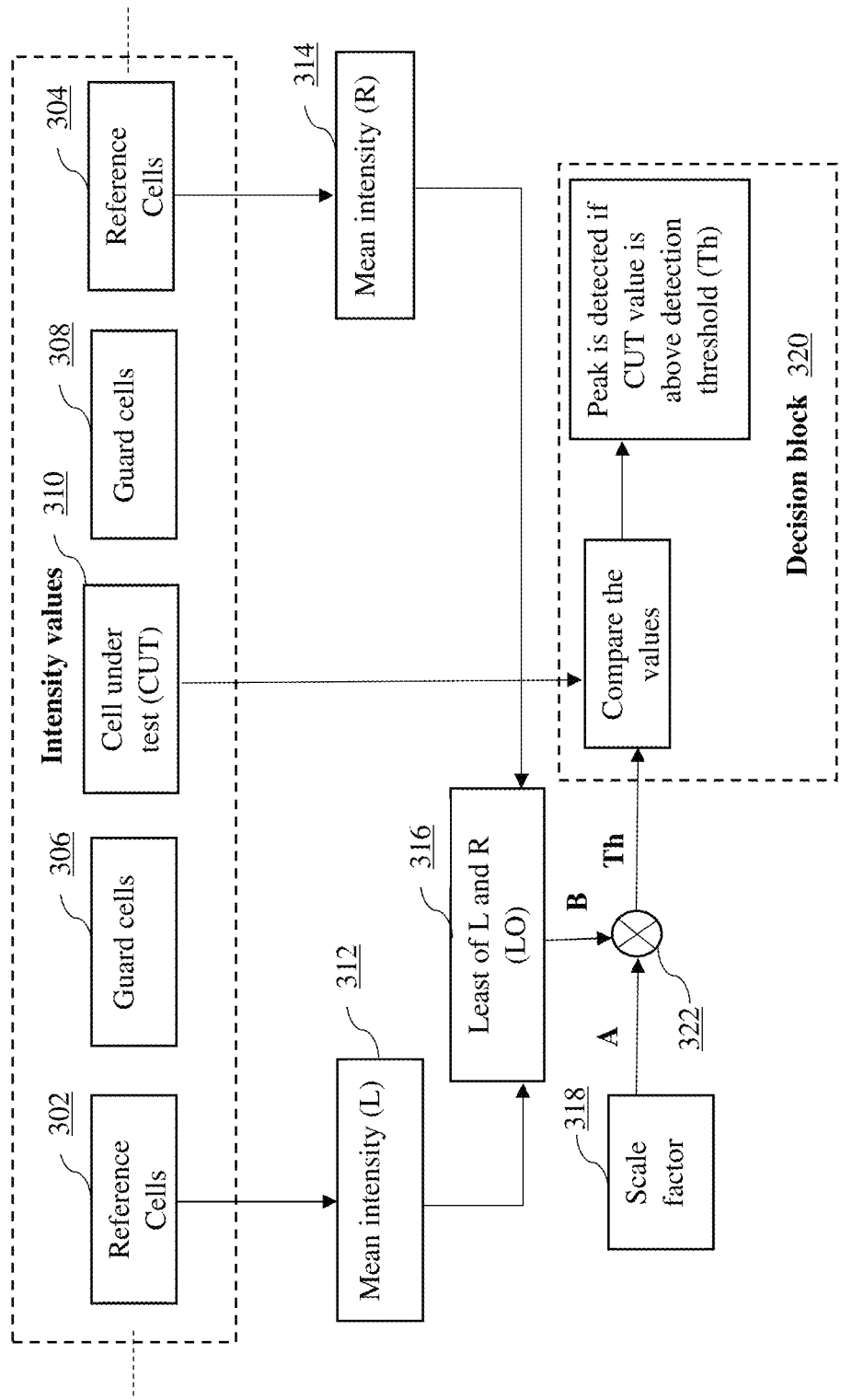
FIG. 3 illustrates functional block diagram of the system of FIG. 1 implementing a sliding constant false alarm rate (CFAR) approach to detect the object under test occluded by packaging, according to some embodiments of the present disclosure.

FIG. 3 illustrates functional block diagram of the system of FIG. 1 implementing the sliding constant false alarm rate (CFAR) approach to detect the object under test 204 occluded by packaging, according to some embodiments of the present disclosure. A one or more guard cells 306 and 308 (i.e., each representing the range bin) immediately adjacent to every cell under test (CUT) 310 are excluded from calculation to avoid corrupting estimate of a surrounding noise floor level with a reflected power (I) from the object under test 204 itself. In an embodiment, a particular cell is chosen from the motion-filtered data matrix which is referred as the cell under test (CUT) 310. A minimum (LO 316) of averages of reference cells 304 and 308 present on both sides of the CUT 310, is then multiplied by a scale factor ($\alpha$) 318 to find the detection threshold value (Th). In an embodiment, the detection threshold value (Th) is determined based on one or more average values 312 and 314 of at least one set for at least one reference cell from set of reference cells 302 and 304, and the scale factor ($\alpha$) 318. In an embodiment, the at least one cell corresponds to at least one guard cell 306 and 308 which are filtered to remove a part of the actual peak value performed at a Decision block 320. The scale factor ($\alpha$) 318 is a constant and selected based on a desired probability of a false alarm, so that ratio of correct and one or more false detections can be set. The false alarm occurs when an intensity of the plurality back-scattered signals exceeds the detection threshold value (Th) at a time and a range point where no desired electronic object is located. The scale factor 318 is calculated as shown in equation 2:

$$\alpha = N \left( P_n^{\frac{-1}{N}} - 1 \right) \quad (2)$$

where, N is a total number of the one or more reference cells 302 and 304 (e.g., 40) and $P_n$ is a probability of the false alarm (e.g., 0.001). With the scaling factor ($\alpha$) 318 and the LO 316 being computed, the detection threshold value (Th) is now calculated by simply multiplying 322 the two values and the detections are made based on following relations as given below:

$I_{CUT} \geq T_h \Rightarrow H_{CUT} = 1$:target detected $I_{CUT} \leq T_h \Rightarrow H_{CUT} = 1$:no target where, $I_{CUT}$ is an intensity value of the one or more back-scattered signals at the position of the CUT 310 and $H_{CUT}$ is a value at a position of the CUT 310 in the enveloped motion-filtered data matrix obtained after applying the CFAR algorithm on the "M".

The object under test 204 within the package have a non-negligible width e.g., 4 cm which results in a band of detections in a CFAR matrix starting from a location of front edge of the object under test 204 and ending at some distance beyond. In an embodiment, further evaluations are restricted in a window of the range bins around position of the object under test 204. This is termed as a range gate which is given as:

$\Delta R = R_2 - R_1, (R_1 < d < R_1)$ where, $R_1$ and $R_2$ are lower and upper bounds of the range gate, respectively. For example, considered that $\Delta R = 20$ cm.

The detection threshold value is determined with the $\alpha$ being calculated as stated in equation 2. This is denoted as $\alpha_{min}$ and value of the $\alpha$ is increased, till the detection sensitivity level is reached. When moving the object under test 204 is detected by using the default scale factor $\alpha$, then an area under a curve (AUC) between $R_1$ and $R_2$ is computed over an entire scan time. This is essentially equivalent to counting number of '1's (i.e., or number of cells for which object is detected), which is expressed as:

$$AUC(\alpha_{min}) = \Sigma_{t=0}^{t_1} \Sigma_{R_1}^{R_2} H_{CUT} \quad (4)$$

A detection sensitivity (S) is calculated. As the $\alpha$ is increased, the AUC($\alpha_{min}$) decreases. The detection sensitivity (S) is defined as a value of scale factor that results in number of detections in the CFAR matrix falling to a certain critical level, below which can be decided that the desired object is not present. Value of the "S" is obtained when the following condition is fulfilled:

$$AUC(S) = k \cdot AUC(\alpha_{min}) \quad (5)$$

where, $0 < k \leq 1$

The variation in the value of 'k' results in different levels of measurement precision and k=0.1 is applied for the presented results. Now, the factor "k" is configurable and can be adjusted so that measurement repeatability is ensured. When a higher value of "k" is given (e.g., k=0.3), the sensitivity level gets reduced and vice-versa. At low sensitivity levels, percentage variation in the "S" is expected to be small for multiple instances of measurement. Therefore, in real deployment scenarios, the "k" value is suitably adjusted with an initial training cycle.

A decision tree depicted in below Table 1 which highlights a detection of whether the object under test 204 is the desired electronic object based on a higher weightage is given to a top antenna which is facing a full face of a device:

TABLE 1

| Classifier | Antenna-1 (Top) | Antenna-2 (Left) | Antenna-3 (Right) | Decision (0.5.Ant1 + 0.25.Ant-2 + 0.25.Ant-3 |
|---|---|---|---|---|
| SVM (Accuracy > 0.9) | Y | N | Y | Y |
| Bagged Tree (Accuracy > 0.9) | N | N | Y | N |
| KNN (Accuracy > 0.9) | Y | N | Y | Y |

Figure 4:
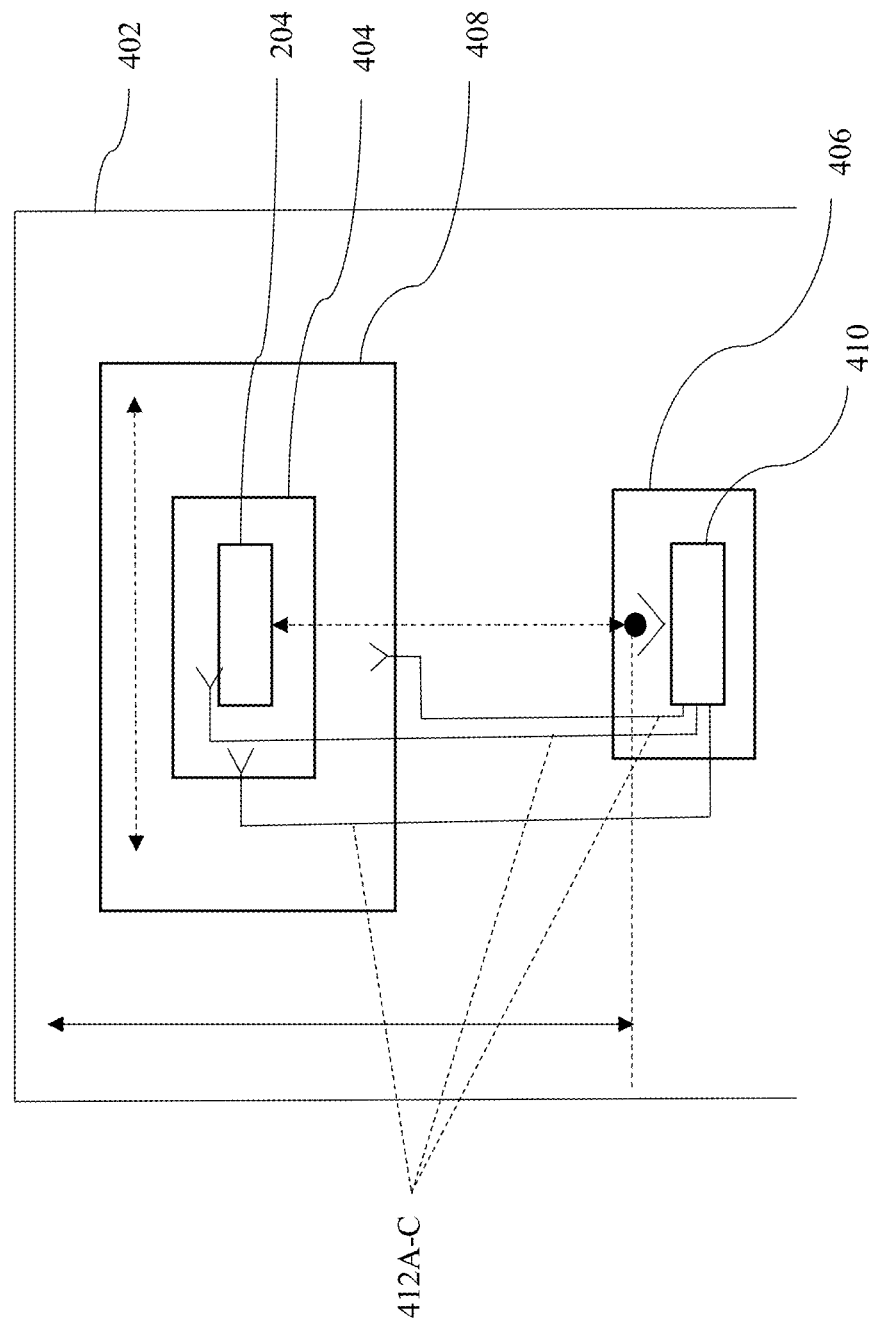
FIG. 4 is an exemplary schematic diagram depicting placement of a radar and antenna unit and a package to detect the object under test, according to some embodiments of the present disclosure.

FIG. 4 is an exemplary schematic diagram depicting placement of the radar and antenna unit and a package to detect the object under test 204, according to some embodiments of the present disclosure. The system 400 includes a wall (e.g., a brick wall) 402, the object under test 204, a vibrating platform 404, a table 406, a platform (e.g., a wooden platform) 408, a radar unit 410, and a plurality of antenna units 412A-C. In an exemplary embodiment, the radar unit 410 and the object under test 204 are surrounded by the wall (e.g., brick wall) 402 on three sides. In an embodiment, both the radar unit 410 and the object under test 204 are placed at approximately 1 m height from a floor. A height at which the radar unit 410 is placed is adjusted to align with a center of the object under test 204. The platform (e.g., a wooden platform) 408 vibrates in an orthogonal plane to a look angle of the radar unit 410, i.e., in a direction of X-axis. In an embodiment, the vibrating platform 404 oscillates at a frequency of about 2.4 Hz.

With reference to FIG. 2, in an alternative embodiment, the plurality of back-scattered signals are received via the second antenna-radar combination mounted on the scanning chamber if the object under test 204 is having a plurality of stops across the scanning chamber. A second antenna-radar combination respectively are selected from a radar and antenna unit. The second antenna-radar combination includes three antennas connected to a radar unit. The radar unit 410 triggers the three antennas in a sequential manner to scan the object under test 204 at the plurality of stops across the scanning chamber. In an embodiment, a time taken for the three antennas to scan is 45 sec. The object under test 204 moves inside the scanning chamber and stopped for imaging at three well-defined positions such as: a leading edge (e.g., D−5 cm), a centre (e.g., D), and a trailing edge (D+5 cm). The plurality of back-scattered signals are utilized in a second approach to detect whether the object under test 204 is the desired electronic object. The plurality of back-scattered signals is converted into a plurality of frequency domain signals by a Fast Fourier transform (FFT). The plurality of back-scattered signals are acquired as a range-time matrix. In an embodiment, each of the plurality of frequency domain signals includes (a) an amplitude component, and (b) a phase component. A plurality of features is extracted from the plurality of frequency domain signals at a first frequency band ($f_0$) and a second frequency band ($2f_0$). The plurality of features captures signal patterns in the plurality of frequency domain signals. The extracted plurality of features are processed by a binary classifier to detect whether the object under test 204 is the desired electronic object. In an embodiment, the binary classifier corresponds to a K nearest neighbour.

A decision tree depicted in below Table 2 which highlights a detection of whether the object under test 204 is the desired electronic object:

TABLE 2

| Classifier | Antenna-1 | | | Antenna-2 | | | Antenna-3 | | | Decision |
|---|---|---|---|---|---|---|---|---|---|---|
| | D − 5 | D | D + 5 | D − 5 | D | D + 5 | D − 5 | D | D + 5 | Y/N |
| SVM (Accuracy > 0.9) | Y | Y | N | Y | Y | Y | N | N | Y | Y |
| Bagged Tree (Accuracy > 0.9) | N | N | Y | N | Y | N | N | Y | N | N |
| KNN (Accuracy > 0.9) | Y | Y | N | Y | Y | N | Y | Y | N | Y | tenna units 202A-C are time synchronized with a maximum uncertainty of +/−500 milli seconds. The detection threshold value is determined based on a plurality of average values of at least one set for at least one reference cell from set of reference cells, and a scale factor ($\alpha$). In an embodiment, the at least one cell corresponds to at least one guard cell which are filtered to remove a part of the actual peak value. The scale factor ($\alpha$) is a constant and selected based on a desired probability of a false alarm. In an embodiment, the false alarm occurs when an intensity of the plurality back-scattered signals exceeds the detection threshold value at a time and a range point where no desired electronic object is located.

Figure 5:
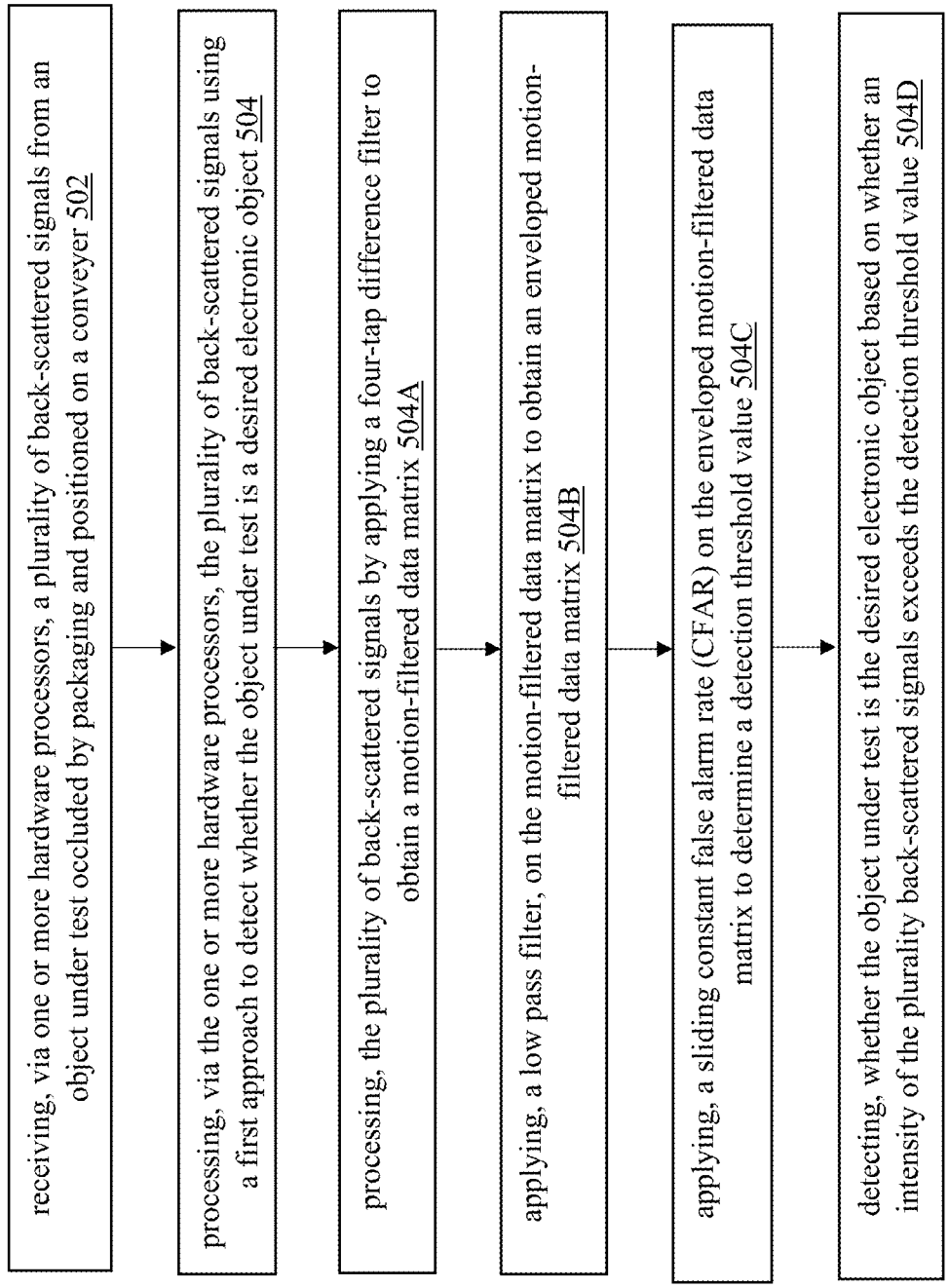
FIG. 5 is an exemplary flow diagram illustrating method of detecting a desired object from an object under test occluded by packaging, according to an embodiment of the present disclosure.

FIG. 5 is an exemplary flow diagram illustrating method (500) of detecting the desired electronic object from the object under test 204 occluded by packaging, according to an embodiment of the present disclosure. In an embodiment, the system 100 comprises one or more data storage devices or the memory 104 operatively coupled to the one or more hardware processors 102 and is configured to store instructions for execution of steps of the method by the one or more processors 102. The flow diagram depicted is better understood by way of following explanation/description. The steps of the method of the present disclosure will now be explained with reference to the components of the system as depicted in FIGS. 1 and 2.

At step 502, a plurality of back-scattered signals is received from an object under test 204 packed inside the package positioned on the conveyer 206. In an embodiment, the plurality of back-scattered signals are received via a first antenna-radar combination mounted on the scanning chamber if the object under test 204 is having continuous motion across the scanning chamber. At step 504, the plurality of back-scattered signals is processed using a first approach to detect whether the object under test 204 is a desired electronic object. In an embodiment, the first approach is applied when the object under test 204 is having continuous motion across the scanning chamber. At step 504A, the plurality of back-scattered signals is processed by applying the four-tap difference filter to obtain the motion-filtered data matrix. At step 504B, the low pass filter is applied on the motion-filtered data matrix to obtain the enveloped motion-filtered data matrix. At step 504C, the sliding constant false alarm rate (CFAR) approach is applied on the enveloped motion-filtered data matrix to determine the detection threshold value. At step 504D, whether the object under test 204 is the desired electronic object is detected based on whether an intensity of the plurality back-scattered signals exceeds the detection threshold value. The first antenna-radar combination includes three antennas connected to three radar units respectively. In an embodiment, the three radar unit triggers the three antennas respectively to scan the object under test 204 from an entry position to an exit position across the scanning chamber. In an embodiment, the three radar-an- In another embodiment, the plurality of back-scattered signals are received via the second antenna-radar combination mounted on the scanning chamber if the object under test 204 is having a plurality of stops across the scanning chamber. The second antenna-radar combination include the three antennas 412A-C connected to the radar unit 410. In an embodiment, the radar unit 410 triggers the three antennas 412A-C in a sequential manner to scan the object under test 204 at the plurality of stops across the scanning chamber. In an alternative embodiment, the plurality of back-scattered signals is processed using the second approach to detect whether the object under test 204 is the desired electronic object. The second approach is applied when the object under test 204 having the plurality of stops across the scanning chamber. The plurality of back-scattered signals is converted into a plurality of frequency domain signals by a Fast Fourier transform (FFT). In an embodiment, the plurality of back-scattered signals are acquired as a range-time matrix. In an embodiment, each of the plurality of frequency domain signals includes (a) an amplitude component, and (b) a phase component. A plurality of features is extracted from the plurality of frequency domain signals at a first frequency band ($f_0$) and a second frequency band ($2f_0$). In an embodiment, the plurality of features captures signal patterns in the plurality of frequency domain signals. The extracted plurality of features is processed by a binary classifier to detect whether the object under test 204 is the desired electronic object. In an embodiment, the binary classifier corresponds to a K nearest neighbour.

Experimental Results

Figure 6:
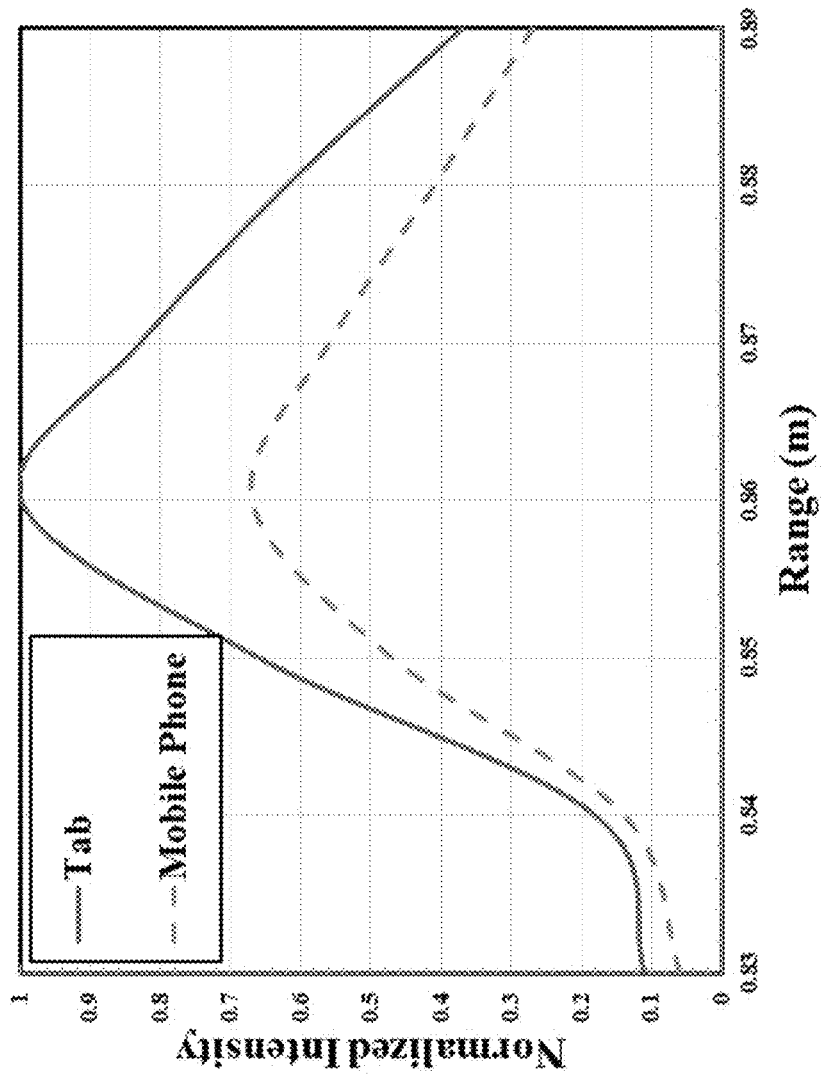
FIG. 6 is an exemplary graphical representation which illustrates a peak intensity values of a back-scattered signal associated with the object under test from the radar and antenna unit, according to an embodiment of the present disclosure.

For example, a study is conducted to distinguish between the desired target, being an eight-inch Tablet in a sealed box, verses other non-tablet objects like an empty tablet box i.e., the sealed box with 6.4-inch mobile phone. The different objects have different reflection and absorption characteristics, thus providing a basis for detecting significant change in content of the sealed box. Measurements are taken for the sealed box to investigate variability of a detection sensitivity levels at a given distance. Also, for each object, measurements are taken at four distances of separation between the radar-antenna unit and object under test 204, which is indicated by "d" where, d=0.75 m, 0.85 m, 0.95 m, 1.05 m. From the experiment, the back-scattered signal for the two cases, namely the 6.4-inch mobile phone and 8-inch Tablet in the sealed box, are plotted in FIG. 6, is an exemplary graphical representation illustrates the peak intensity values of the back-scattered signal associated with the object under test 204 at 0.75 m from one or more radar units, according to an embodiment of the present disclosure. The Tablet box with a depth of 4 cm which corresponds to approximately four range bins from an entry and an exit point. However, from the plots, there is a spread of received signal over 10 cm in range is noticed. This is partly accounted for by averaging process induced by the four-Tap difference filter followed by sixth order low pass filter. At same time, the sealed box, by default, consists of a charger and other packaging materials, which leads to possibility that speed of electromagnetic wave is reduced (i.e., due to higher dielectric constant), thus resulting in range-stretching.

Figure 7A:
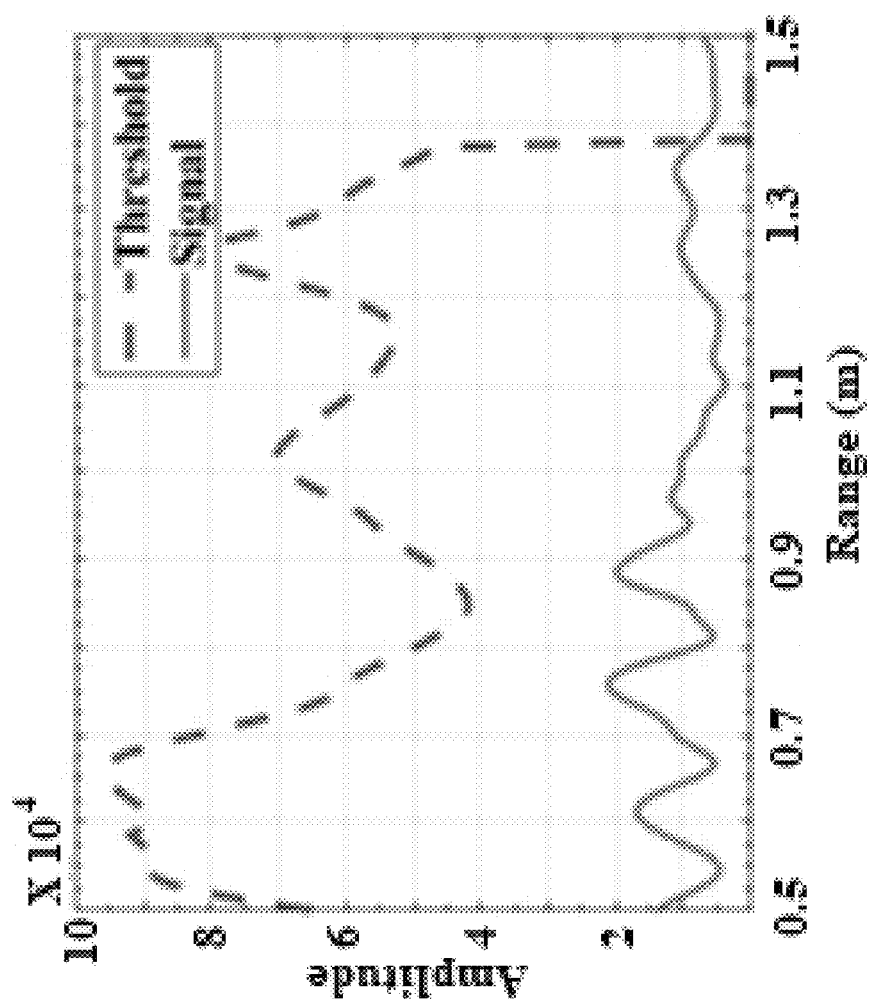
FIGS. 7A-7C are exemplary graphical representations illustrates detection threshold values and signal intensity at a distance and for a given instance of time for the object under test, according to an embodiment of the present disclosure.
Figure 7B:
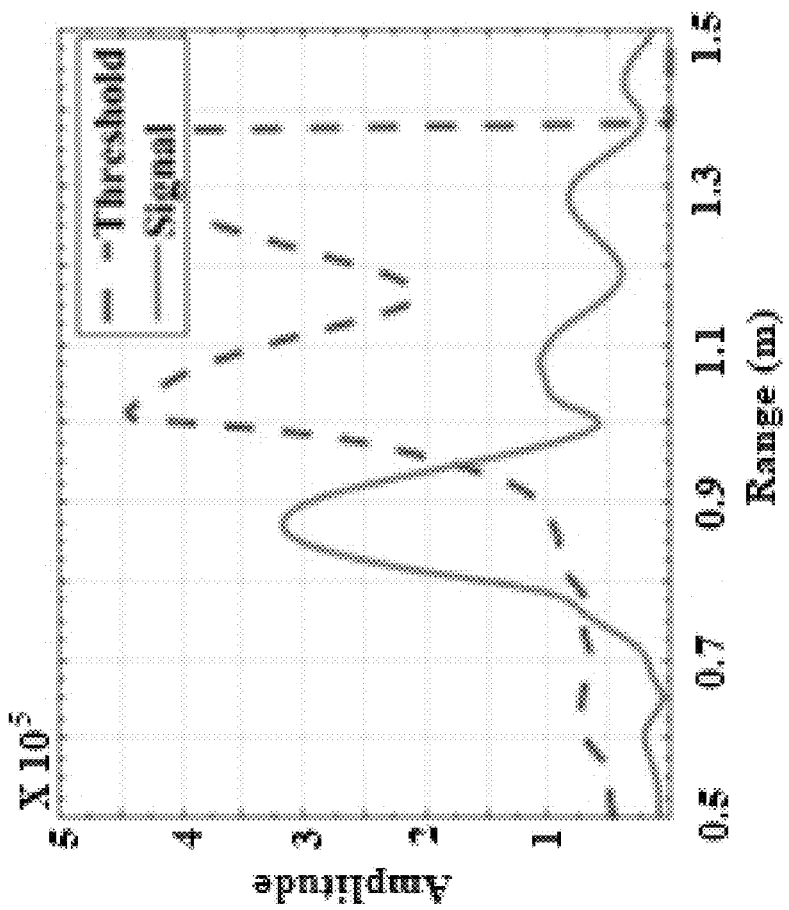
Figure 7C:
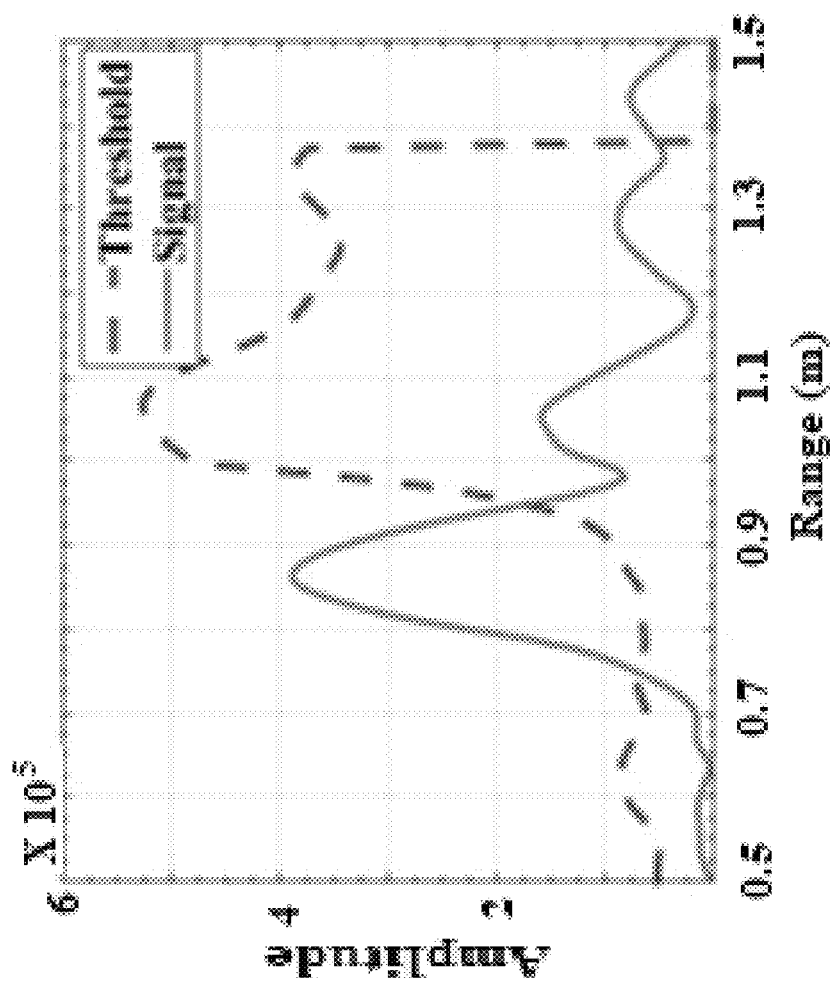

In next step, the detection threshold values for all the range bins are computed. With reference to FIGS. 7A-7C, are exemplary graphical representations illustrates the detection threshold values and the signal intensity at a distance d=0.75 m and for a given instance of time for the object under test 204, according to an embodiment of the present disclosure, namely the empty Tablet box, the 6.4-inch mobile phone inside the sealed box, and the 8-inch Tablet inside the sealed box at 10 s time point at d=0.75 m. A detection range (i.e., represented by peak of amplitude curve of signal) is followed by a sharp increase in the detection threshold value at a nominally fixed distance from the object under test 204 and behind the object under test 204 with respect to the radar-antenna unit. This effect is referred as a shadow region is consistent for both the Tablet and the mobile phone for all the four measurement distances. The shadow region is observed to be formed in between 0.14 m to 0.18 m distance behind the object under test 204.

Initially, the scale factors are computed, giving a result of $\alpha_{min}$=7.54. Using this default scale factor, the modified CFAR images of all the objects for a measurement distance of 0.75 m are plotted in the range-time scale.

Figure 8:
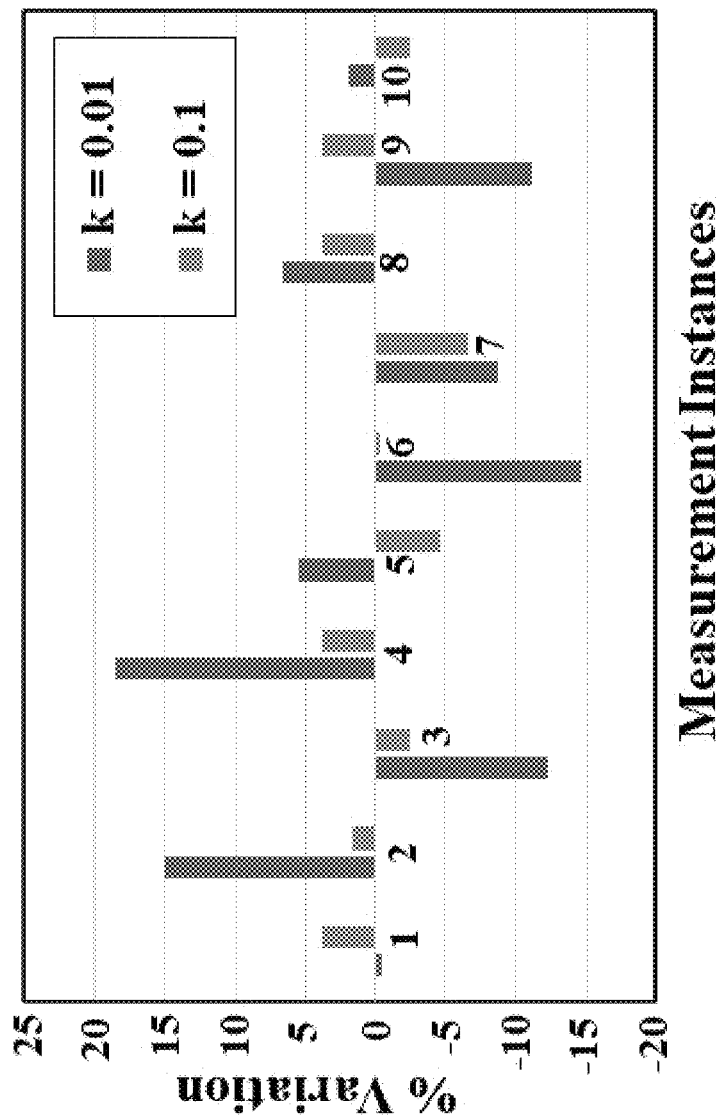
FIG. 8 is an exemplary graphical representation depicting a percentage variation of a detection sensitivity (S) for the object under test, according to an embodiment of the present disclosure.

For example, variations in level of the detection sensitivity (S) for the Tablet inside the sealed box is anticipated for different measurement instances. To test the variability, ten measurements are taken at different instances of time. With reference to FIG. 8, is an exemplary graphical representation depicting a percentage variation of values of the detection sensitivity (S) associated with the Tablet at a distance of 0.95 m is displayed for k=0.01 and 0.1, respectively for the object under test 204, according to an embodiment of the present disclosure. The measurement parameters are kept identical in all instances and measurements are taken by putting the object in line-of-sight of the one or more radar unit and pulling out immediately after a fixed scan time period. The percentages are calculated with respect to the mean value of the detection sensitivity (S) obtained from all the ten observations. The results presented in the FIG. 8, validates that by setting k=0:01, wider variation of detection sensitivity levels for the same object can be obtained.

Figure 9:
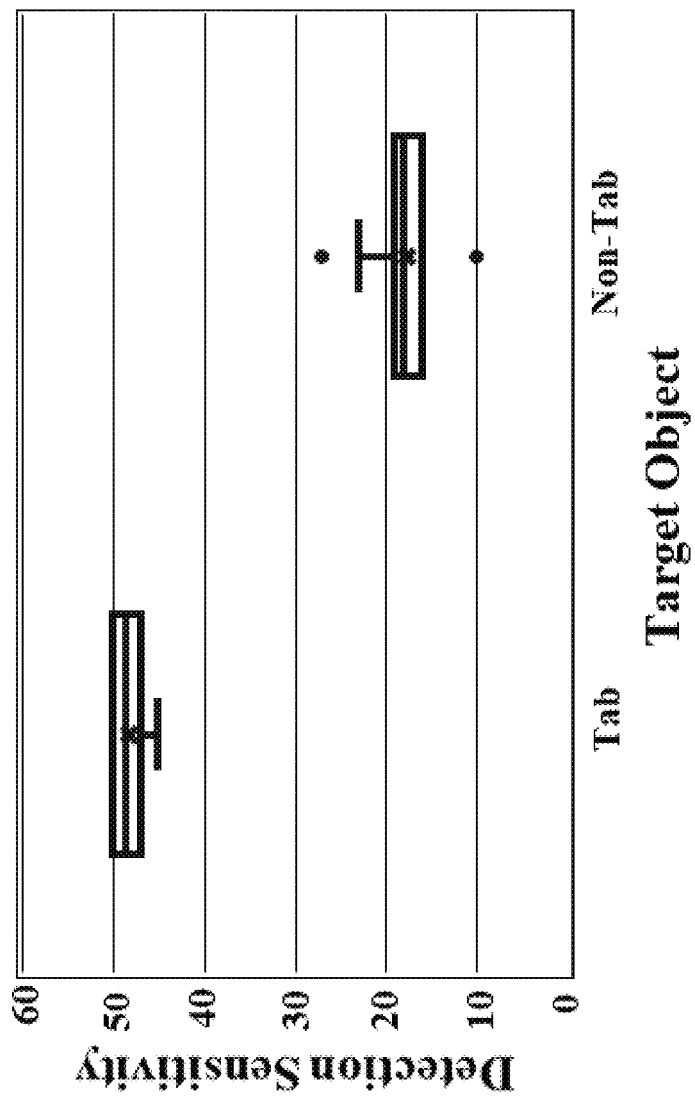
FIG. 9 is an exemplary graphical representation depicting the detection sensitivity (s) at a fixed distance, for both a tablet category and a non-Tablet category respectively, according to an embodiment of the present disclosure.

With reference to FIG. 9, is an exemplary graphical representation depicting the detection sensitivity (s) at a fixed distance of 0.95 m, for both the tablet and non-Tablet categories, according to an embodiment of the present disclosure. The detection sensitivity (S) for the Tablet, and the mobile phone are further evaluated at four measurement distances. For example, one or more ratios associated with the detection sensitivity (S) for the Tablet to the empty box and that of Tablet to the mobile phone are tabulated in Table 3. From Table 3, the ratios of detection sensitivities are distinctly different for all three cases. The observation illustrates that: (a) presence of an 8-inch Tablet vs a 6.4-inch mobile phone inside the sealed box is easily identifiable when the object is in motion with respect to the radar unit, and (b) The detection sensitivity (S) is a sole determinant for identification of type of the object inside the sealed box, thus offering a successful approach for change detection.

TABLE 3

| | Detection Sensitivity ratios | |
|---|---|---|
| d (m) | ($S_{Tab}/S_{emptybox}$) | ($S_{Tab}/S_{mobile\ phone}$) |
| 0.75 | 4.95 | 1.41 |
| 0.85 | 4.36 | 1.26 |
| 0.95 | 4.69 | 1.36 |
| 1.05 | 5.03 | 1.42 |

The embodiment of the present disclosure provides an approach of marker-less identification of the desired electronic object in occluded space when the object under test are rolled out and when they are returned to the warehouse. The embodiment of the present disclosure does not require external tag or any other form of marker. The embodiment of the present disclosure in which there are no aberrations are introduced on the desired electronic object itself which can be used for detection. The embodiment of the present disclosure provides an UWB radar-based change detection technique is introduced where the one or more radar units are static and the object under test is in to-and-fro motion. The embodiment of the present disclosure provides a quantitative method to distinguish a high-value consumer product (e.g., a concealed Pad) from other similar devices. The modified CFAR approach is used to compute the detection sensitivity levels and the scale factor in the modified CFAR approach is adapted to obtain the detection sensitivity thresholds for each object under test. The detection sensitivity levels for the Tablet and non-Tablet objects (where both are inside the identified box) are statistically separated, thereby offering an easy method to detect a change inside the package through comparative analysis.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for detecting a desired object from an object under test occluded by packaging, comprising:

scanning, via one or more hardware processors, the object under test packed inside a package positioned on a conveyor using ultra-wide band signals of an antenna-radar unit mounted on a scanning chamber;

receiving, via the one or more hardware processors, a plurality of back-scattered signals from the object under test by the antenna-radar unit-; and processing, via the one or more hardware processors, the plurality of back-scattered signals using a first approach to detect whether the object under test is the desired object, wherein the first approach is applied when the object under test is having continuous motion across the scanning chamber, wherein processing via the first approach comprises:

(a) processing, the plurality of back-scattered signals by applying a four-tap difference filter to obtain a motion-filtered data matrix;

(b) applying, a low pass filter, on the motion-filtered data matrix to obtain an enveloped motion-filtered data matrix;

(c) applying, a sliding constant false alarm rate (CFAR) on the enveloped motion-filtered data matrix to determine a detection threshold value, wherein the detection threshold value is determined based on a scale factor ($\alpha$), and wherein the scale factor ($\alpha$) is a constant and selected based on a desired probability of a false alarm; and (d) detecting, whether the object under test is the desired object based on whether an intensity of the plurality back-scattered signals exceeds the detection threshold value, wherein the false alarm occurs when the intensity of the plurality back-scattered signals exceeds the detection threshold value at a time and a range point where no desired object is located, wherein the detection threshold value is determined based on a plurality of average values of at least one set for at least one reference cell from set of reference cells, and a scale factor ($\alpha$), and wherein the at least one cell corresponds to at least one guard cell which are filtered to remove a part of the actual peak value and wherein one or more guard cells, each said at least one guard cell representing a range bin that are immediately adjacent to every cell under test (CUT) are excluded from calculation to avoid corrupting estimate of a surrounding noise floor level when a reflected power (I) from an object under test, and a particular cell is chosen from the CUT, and a minimum (LO) of averages of reference cells present on both sides of the CUT, is multiplied by a scale factor ($\alpha$) to find the detection threshold value (Th).

2. The processor implemented method as claimed in claim 1, processing, via the one or more hardware processors, the plurality of back-scattered signals using a second approach to detect whether the object under test is the desired object, wherein the second approach is applied when the object under test having a plurality of stops across the scanning chamber, wherein processing via the second approach comprises:

converting, the plurality of back-scattered signals into a plurality of frequency domain signals by a Fast Fourier transform (FFT), wherein the plurality of back-scattered signals are acquired as a range-time matrix, wherein each of the plurality of frequency domain signals comprises (a) an amplitude component, and (b) a phase component;

extracting, via the one or more hardware processors, a plurality of features from the plurality of frequency domain signals at a first frequency band ($f_0$) and a second frequency band ($2f_0$), wherein the plurality of features captures signal patterns in the plurality of frequency domain signals; and processing, by a binary classifier, the extracted plurality of features to detect whether the object under test is the desired object, wherein the binary classifier corresponds to a K nearest neighbour.

3. The processor implemented method as claimed in claim 1, wherein the antenna-radar unit comprises a first antenna-radar combination having three radar units, wherein the three radar units comprises three antennas connected to three radar units respectively, wherein the first antenna-radar combination scans the object under test from an entry position to an exit position across the scanning chamber, and wherein the three radar units are time synchronized with a maximum uncertainty of +/−500 milli seconds.

4. The processor implemented method as claimed in claim 2, wherein the antenna-radar unit comprises a second antenna-radar combination having three antennas connected to a radar unit, and wherein the second antenna-radar combination scans the object under test in a sequential manner at the plurality of stops across the scanning chamber.

5. A system for detection of a desired object from an object under test occluded by packaging, comprising:
a memory storing instructions;
one or more communication interfaces; and
one or more hardware processors coupled to the memory via the one or more communication interfaces, wherein the one or more hardware processors are configured by the instructions to:
scan, the object under test packed inside a package positioned on a conveyer using ultra-wide band signals of an antenna-radar unit mounted on a scanning chamber;
receive, a plurality of back-scattered signals from the object under test by the antenna-radar unit; and
process, the plurality of back-scattered signals using a first approach to detect whether the object under test is the desired object, wherein the first approach is applied when the object under test is having continuous motion across the scanning chamber, wherein process via the first approach comprises:
(a) process, the plurality of back-scattered signals by applying a four-tap difference filter to obtain a motion-filtered data matrix;
(b) apply, a low pass filter, on the motion-filtered data matrix to obtain an enveloped motion-filtered data matrix;
(c) apply, a sliding constant false alarm rate (CFAR) on the enveloped motion-filtered data matrix to determine a detection threshold value, wherein the detection threshold value is determined based on a scale factor (a), and wherein the scale factor (a) is a constant and selected based on a desired probability of a false alarm; and
(d) detect, whether the object under test is the desired object based on whether an intensity of the plurality back-scattered signals exceeds the detection threshold value, wherein the false alarm occurs when the intensity of the plurality back-scattered signals exceeds the detection threshold value at a time and a range point where no desired object is located, wherein the detection threshold value is determined based on a plurality of average values of at least one set for at least one reference cell from set of reference cells, and a scale factor ($\alpha$), and wherein the at least one cell corresponds to at least one guard cell which are filtered to remove a part of the actual peak value and wherein one or more guard cells, each said at least one guard cell representing a range bin that are immediately adjacent to every cell under test (CUT) are excluded from calculation to avoid corrupting estimate of a surrounding noise floor level with a reflected power (I) from an object under test, and a particular cell is chosen from the CUT, and a minimum (LO) of averages of reference cells present on both sides of the CUT, is multiplied by a scale factor ($\alpha$) to find the detection threshold value (Th).

6. The system as claimed in claim 5, wherein the one or more hardware processors are further configured by the instructions to process, the plurality of back-scattered signals using a second approach to detect whether the object under test is the desired object, wherein the second approach is applied when the object under test having a plurality of stops across the scanning chamber, wherein process via the second approach comprises:
convert, the plurality of back-scattered signals into a plurality of frequency domain signals by a Fast Fourier transform (FFT), wherein the plurality of back-scattered signals are acquired as a range-time matrix, wherein each of the plurality of frequency domain signals comprises (a) an amplitude component, and (b) a phase component;
extract, a plurality of features from the plurality of frequency domain signals at a first frequency band ($f_0$) and a second frequency band ($2f_0$), wherein the plurality of features captures signal patterns in the plurality of frequency domain signals; and
process, by a binary classifier, the extracted plurality of features to detect whether the object under test is the desired object, wherein the binary classifier corresponds to a K nearest neighbour.

7. The system as claimed in claim 5, wherein the antenna-radar unit comprises a first antenna-radar combination having three radar units, wherein the three radar units comprises three antennas connected to three radar units respectively, wherein the first antenna-radar combination scans the object under test from an entry position to an exit position across the scanning chamber, and wherein the three radar units are time synchronized with a maximum uncertainty of +/−500 milli seconds.

8. The system as claimed in claim 6, wherein the antenna-radar unit comprises a second antenna-radar combination having three antennas connected to a radar unit, and wherein the antenna-radar unit scans the object under test in a sequential manner at the plurality of stops across the scanning chamber.

9. One or more non-transitory machine-readable information storage mediums comprising one or more instructions which when executed by one or more hardware processors causes:
scanning the object under test packed inside a package positioned on a conveyor using ultra-wide band signals of an antenna-radar unit mounted on a scanning chamber;
receiving, a plurality of back-scattered signals from the object under test by the antenna-radar unit; and
processing, the plurality of back-scattered signals using a first approach to detect whether the object under test is the desired object, wherein the first approach is applied when the object under test is having continuous motion across the scanning chamber, wherein processing via the first approach comprises:
(a) processing, the plurality of back-scattered signals by applying a four-tap difference filter to obtain a motion-filtered data matrix;
(b) applying, a low pass filter, on the motion-filtered data matrix to obtain an enveloped motion-filtered data matrix;
(c) applying, a sliding constant false alarm rate (CFAR) on the enveloped motion-filtered data matrix to determine a detection threshold value, wherein the detection threshold value is determined based on a scale factor ($\alpha$), and wherein the scale factor ($\alpha$) is a constant and selected based on a desired probability of a false alarm; and
(d) detecting, whether the object under test is the desired object based on whether an intensity of the plurality back-scattered signals exceeds the detection threshold value, wherein the false alarm occurs when the intensity of the plurality back-scattered signals exceeds the detection threshold value at a time and a range point where no desired object is located, wherein the detection threshold value is determined based on a plurality of average values of at least one set for at least one reference cell from set of reference cells, and a scale factor ($\alpha$), and wherein the at least one cell corresponds to at least one guard cell which are filtered to remove a part of the actual peak value and wherein one or more guard cells, each said at least one guard cell representing a range bin that are immediately adjacent to every cell under test (CUT) are excluded from calculation to avoid corrupting estimate of a surrounding noise floor level with a reflected power (I) from an object under test, and a particular cell is chosen from the CUT, and a minimum (LO) of averages of reference cells present on both sides of the CUT, is multiplied by a scale factor ($\alpha$) to find the detection threshold value (Th).

10. The one or more non-transitory machine-readable information storage mediums of claim 9, processing, the plurality of back-scattered signals using a second approach to detect whether the object under test is the desired object, wherein the second approach is applied when the object under test is having a plurality of stops across the scanning chamber, wherein processing via the second approach comprises:
converting, the plurality of back-scattered signals into a plurality of frequency domain signals by a Fast Fourier transform (FFT), wherein the plurality of back-scattered signals are acquired as a range-time matrix, wherein each of the plurality of frequency domain signals comprises (a) an amplitude component, and (b) a phase component;
extracting, a plurality of features from the plurality of frequency domain signals at a first frequency band ($f_0$) and a second frequency band ($2f_0$), wherein the plurality of features captures signal patterns in the plurality of frequency domain signals; and
processing, by a binary classifier, the extracted plurality of features to detect whether the object under test is the desired object, wherein the binary classifier corresponds to a K nearest neighbour.

11. The one or more non-transitory machine-readable information storage mediums of claim 9, wherein the antenna-radar unit comprises a first antenna-radar combination having three radar units, wherein the three radar units comprises three antennas connected to three radar units respectively, wherein the first antenna-radar combination scans the object under test from an entry position to an exit position across the scanning chamber, and wherein the three radar units are time synchronized with a maximum uncertainty of +/−500 milli seconds.

12. The one or more non-transitory machine-readable information storage mediums of claim 10, wherein the antenna-radar unit comprises a second antenna-radar combination having three antennas connected to a radar unit, and wherein the second antenna-radar combination scans the object under test in a sequential manner at the plurality of stops across the scanning chamber.

* * * * *